United States Patent
Borkenhagen et al.

(10) Patent No.: US 6,836,831 B2
(45) Date of Patent: Dec. 28, 2004

(54) INDEPENDENT SEQUENCERS IN A DRAM CONTROL STRUCTURE

(75) Inventors: John Michael Borkenhagen, Rochester, MN (US); Robert Allen Drehmel, Goodhue, MN (US); Brian T. Vanderpool, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 10/215,404

(22) Filed: Aug. 8, 2002

(65) Prior Publication Data

US 2004/0030849 A1 Feb. 12, 2004

(51) Int. Cl.[7] .............................................. G06F 13/16
(52) U.S. Cl. .......................................... 711/169; 711/5
(58) Field of Search .............................. 710/112; 711/5, 711/150, 151, 157, 168, 169, 172

(56) References Cited

U.S. PATENT DOCUMENTS 5,323,489 A * 6/1994 Bird ........................... 711/167
6,381,683 B1 * 4/2002 Strongin et al. ............. 711/158
6,532,505 B1 * 3/2003 Stracovsky et al. ........... 710/63
6,564,304 B1 * 5/2003 Van Hook et al. .......... 711/154

* cited by examiner

*Primary Examiner*—Gary Portka
(74) *Attorney, Agent, or Firm*—Robert R. Williams

(57) ABSTRACT

Methods and apparatus in a computer system are disclosed for providing a memory controller featuring a dedicated bank sequencer for each memory bank in a memory system. Each bank sequencer controls the dispatch of load and store requests to a central controller such that each request sent to the central controller can be served by the associated memory bank at the time that the central controller receives the request. Since every request received by the central controller is valid from a bank timing standpoint, the central controller is free to process the requests from a predetermined priority basis, without concern for bank availability. This significantly improves the design of the memory controller in the processing system.

12 Claims, 5 Drawing Sheets

RULES:
RAS-CAS = 3 CYCLES
RAS-RAS, SAME BANK = 11 CYCLES
CAS-RAS, DIFFERENT BANK = 1 CYCLE
CAS-DATA = 3 CYCLES

Fig 3A (PRIOR ART)

| CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| RAS | A | | | | | | | | | | | B | | | | | | | | | | |
| CAS | | | | A | | | | | | | | | | B | | | | | | | | |
| DATA | | | | | | | A | A | A | A | | | | | | | | B | B | B | B | |

Reads: to a single bank
Fig 3B (PRIOR ART)

| CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| RAS | A | | | | B | | | | | C | | | | D | | | | | | | | |
| CAS | | | | A | | | | B | | | | C | | | | D | | | | | | |
| DATA | | | | | | | A | A | A | A | B | B | B | B | C | C | C | C | D | D | D | D |

Reads: to Separate Banks
Fig 3C (PRIOR ART)

| CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| RAS | A | | | | B | | | | | | | C | | | D | | | | | | | |
| CAS | | | | A | | | | B | | | | | | C | | | | D | | | | |
| DATA | | | | | | | A | A | A | B | B | B | B | | | | C | C | C | C | D | |

Reads: A and C are in same bank
Fig 3D (PRIOR ART)

| CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| RAS | A | | | | B | | | D | | | | | C | | | | | | | | | |
| CAS | | | | A | | | | B | | | D | | | | C | | | | | | | |
| DATA | | | | | | | A | A | A | B | B | B | B | D | D | D | D | C | C | C | C | |

Reads: A and C are in same bank; reordered
Fig 3E

US 6,836,831 B2

INDEPENDENT SEQUENCERS IN A DRAM CONTROL STRUCTURE

FIELD OF THE INVENTION

The present invention relates to Dynamic Random Access Memory (DRAM) controllers. In particular, the present invention discloses an improved memory controller that provides for better memory data bus utilization for a random series of memory accesses.

DESCRIPTION OF RELATED ART

Digital data processing products comprise one or more processors. These processors are electrically coupled to input/output devices such as disk storage, tape storage, keyboards, and displays, for examples. The processors are also coupled to a memory. The memory is often configured as a hierarchy to provide a tradeoff between the costs of each level in the hierarchy, the size of each level, the access time to receive data from each level, and the bandwidth available to transfer data to or from each level.

For example, a level-1 cache (L1 cache) is usually placed physically on the same chip as a processor. Typically the processor can access data from L1 cache in one or two processor clock cycles. L1 cache is normally optimized for latency, meaning that the primary design goal is to get data from the L1 cache to the processor as quickly as possible. L1 caches are usually designed in Static Random Access Memory (SRAM) and occupy a relatively large amount of space per bit of memory on the semiconductor chip. As such, the cost per bit is high. L1 caches are typically designed to hold 32,000 bytes (32 KB) to 512 KB of data.

A level-2 (L2 cache) is normally designed to hold much more information than an L1 cache. The L2 cache usually contains 512 KB to 16,000,000 bytes (16 MB) of data storage capacity. The L2 cache is typically also implemented with SRAM memory, but in some cases, is implemented as DRAM. The L2 cache typically takes several cycles to access.

A level-3 (L3 cache) is normally designed to hold much more information than an L2 cache. The L3 cache typically contains from 16 MB to 256 MB, and is commonly implemented with DRAM memory. The L3 cache is frequently on separate semiconductor chips from the processor, with signals coupling the processor with the L3 cache. These signals are routed on modules and printed wiring boards (PWB's).

A main memory is almost always implemented in DRAM memory technology, and is optimized for low cost per bit, as well as size. Today's large computers have main memory storage capacities of many gigabytes.

FIG. 1 shows a high-level block diagram of a computer. The computer comprises one or more processors. Modern computers may have a single processor, two processors, four processors, eight processors, 16 processors, or more. Processors 2A–2N are coupled to a memory 6 by a memory controller 4. Memory 6 can be any level of cache or main memory; in particular, memory 6 is advantageously implemented in DRAM for the present invention. A processor data bus 3 couples processors 2A–2N to memory controller 4. A memory data bus 5 couples memory controller 4 to memory 6. Optimizing the use of the bandwidth available on memory data bus 5 is important to maximize the throughput of the computer system. Memory data bus 5 should not be idle when there are outstanding requests for data from processors 2A–2N. A conventional memory controller comprises a number of command sequencers 8. Each command sequencer 8 manages one request at a time (a load request or a store request), and the command sequencer 8, when in control of memory data bus 5, is responsible for driving the Row Address Strobe (RAS), the Column Address Strobe (CAS), and any other associated control signals to memory 6 over memory data bus 5. Control typically passes from one command sequencer 8 to another command sequencer 8 in a round robin fashion. Memory controller 4 strives to make sure that each command sequencer 8 has a request to handle, to the degree possible in the current workload.

FIG. 2 is a more detailed view of memory 6, showing that memory 6 comprises banks bank 0, bank 1, bank 2, and bank 3. Four banks are shown for exemplary purposes, but more or fewer banks could be implemented in a particular design. Each bank has timing requirements that must be complied with. In some applications, e.g., numeric intensive applications, a particular type of DRAM, the Synchronous DRAM (SDRAM) can be operated in page mode, with many accesses to the same page, where a page is the same as a bank. Commercial workloads have a high percentage of random accesses so page mode does not provide any performance benefit. In non-page mode, SDRAMs are designed for peak performance when consecutive accesses are performed to different banks. A read is first performed by opening a bank with a RAS (Row Address Strobe) to open a bank, waiting the requisite number of cycles, applying a CAS (Column Address Strobe), waiting the requisite number of cycles, after which the data is transmitted from the bank into the memory controller 4. Memory controller 4 must wait several cycles for the row in the bank to precharge (tRP) before reactivating that bank. A write is performed by opening a bank (RAS), issuing a write command along with a CAS, and transmitting data from memory controller 4 to the SDRAMs in the opened bank. That bank cannot be re-accessed until a write recovery (tWR) has elapsed, as well as the row precharge time (tRP).

Switching the SDRAM data bus from performing a read to a write is expensive in terms of time, requiring the amount of time to clear the data bus of the read data from the last read command. When switching from writes to reads, the write data must be sent to the SDRAMs and the write recovery time must complete before a read command can be sent. The penalty incurred when switching from reads to writes, or writes to reads, is called the bus turnaround penalty.

FIGS. 3A–3E provide an example, using reads, showing how bandwidth on memory data bus 5 can be wasted if data from a particular bank is repeatedly accessed.

FIG. 3A lists the timing rules in the example. RAS-CAS delay is 3 cycles. RAS-RAS delay, when the same bank is being addressed is 11 cycles. CAS-RAS delay, when addressing a different bank is one cycle. CAS-data delay is 3 cycles. A data transmittal, seen in FIGS. 3B–3E requires four bus cycles.

FIG. 3B shows the sequential use of a single bank. Data A and data B are presumed to be in the same bank. That bank is opened with a RAS at cycle 1. The CAS is on cycle 4. Data is transmitted from that bank over memory data bus 5 to memory controller 4 during cycles 7, 8, 9, and 10. Because of the RAS-RAS 11-cycle requirement when the same bank is addressed, the bank cannot be opened again to read data B until cycle 12. The CAS for reading data B is sent on cycle 15, and data B is transmitted from that bank over memory data bus 5 to memory controller 4 on cycles 18, 19, 20, and 21. Note that, in this example, memory data bus 5 is not utilized on cycles 11, 12, 13, 14, 15, 16, and 17. As stated above, memory data bus 5 is used far more efficiently when consecutive accesses are to different banks.

FIG. 3C shows optimal memory data bus 5 usage when consecutive reads are to different banks. Requests A, B, C, and D are for data in separate banks. The RAS for data A is sent at cycle 1; the CAS for data A is sent at cycle 4. The RAS for data B can be sent at cycle 5, per the rules given in FIG. 3A. The CAS for data B is sent at cycle 8. Similarly, the RAS and CAS for data C are sent on cycles 9 and 12. The RAS and CAS for data D are sent on cycles 13 and 16. Memory data bus 5 is kept 100% busy once data transmittal has started.

FIG. 3D shows a case where requests for A, B, C, and D are consecutive requests from processors 2A–2N, but where data A and data C are in the same bank. Using the timing requirements of FIG. 3A, the bank containing data C cannot be reopened until the 12th cycle. This causes a 3-cycle gap in memory data bus 5 utilization, as shown in FIG. 3D.

FIG. 3E shows how memory access requests can be reordered, and will be described in detail later in terms of the disclosed invention.

The memory controller has a very complicated task of managing the bank timings, maximizing the utilization of the memory data bus, and prioritizing reads over writes, when possible. Furthermore, often, requests to access the same memory bank exist in multiple command sequencers. Such requests to access the same memory bank can cause gaps in memory data bus usage in a round robin command sequence activation scheme; alternatively, prioritization of the command sequencers can be accomplished only through extremely complicated logic and a large number of wires coupling the various command sequencers.

Therefore, there is a need for a memory controller design that improves the management of memory bank control, allowing for easier optimization of the memory data bus utilization.

SUMMARY OF THE INVENTION

The present invention is a method and apparatus that provides an improved memory controller that optimizes memory bus utilization for a series of memory accesses.

The present invention discloses a computer system with a memory, a memory controller, and a processor, wherein the memory controller is capable of reordering load and store requests in order to optimize the use of a memory data bus.

The present invention discloses a computer system with a memory controller having a dedicated bank sequencer for each memory bank. Each bank sequencer maintains queues of load and store requests destined for the bank for which the bank sequencer is dedicated. Each bank sequencer maintains timing information for its bank and does not forward requests to a central controller until its bank is available to service the request. The central controller receives requests, which are therefore already guaranteed to comply with bank timing requirements. The central controller can then dispatch requests to the memory based on predetermined priorities, without having to consider whether a particular request is valid from a bank timing requirement.

In an embodiment, the central controller comprises a single data bus sequencer. The single data bus sequencer advantageously comprises a read data bus sequencer and a write data bus sequencer. Since all requests to the memory controller are guaranteed to comply with bank timing requirements, the central controller can move any request forwarded to the memory controller to the data bus sequencer at the discretion of the memory controller for immediate execution on the memory data bus. The data bus sequencer does not have to be capable of delaying execution of the request; it need only be designed to comply with the RAS, CAS, and other control timing requirements of the memory.

BRIEF DESCRIPTION OF THE DRAWINGS

FIGS. 3A–3E provide an exemplary set of timing rules for memory access, and several exemplary sets of access situations.

FIG. 5 shows an exemplary address that can be used to access data in the memory. A portion of the address defines which memory bank the data is to be written to or read from.

DETAILED DESCRIPTION OF THE PREFERRED EMBODIMENTS

Having reference now to the figures, the present invention will be described in detail.

Figure 1:
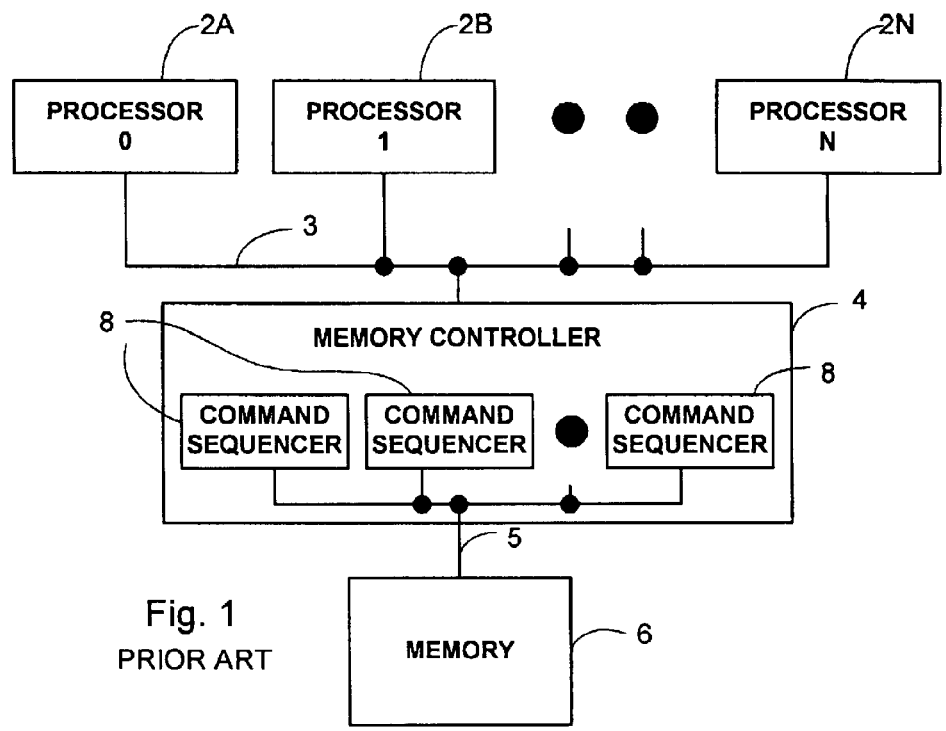
FIG. 1 shows a block diagram of a computer, featuring processors, a processor bus, a memory controller, and a memory.

FIG. 1, already described, has shown a computer system, comprising processors 2A–2N, a memory controller 4, and a memory 6. Processors 2A–2N are coupled to memory controller 4 by processor data bus 3. Memory controller 4 is coupled to memory 6 by memory data bus 5.

Figure 2:
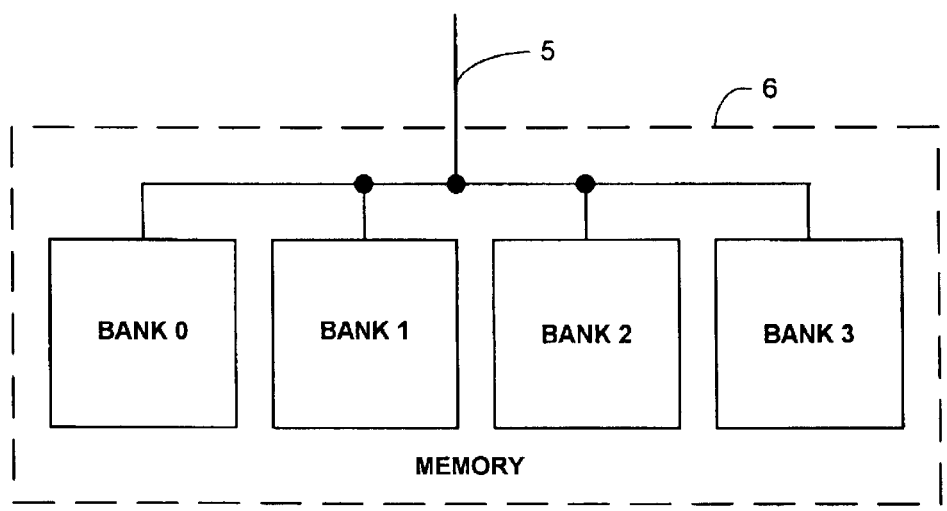
FIG. 2 shows a more detailed block diagram of the memory, highlighting the banked architecture of a memory.

FIG. 2, already described, has shown memory 6 comprising a plurality of memory banks, bank 0, bank 1, bank 2, and bank 3.

FIGS. 3A–3D, already described, has shown an example of complexities arising from satisfying timing requirements of memory banks. FIG. 3E is described later in terms of the current invention.

Figure 4:
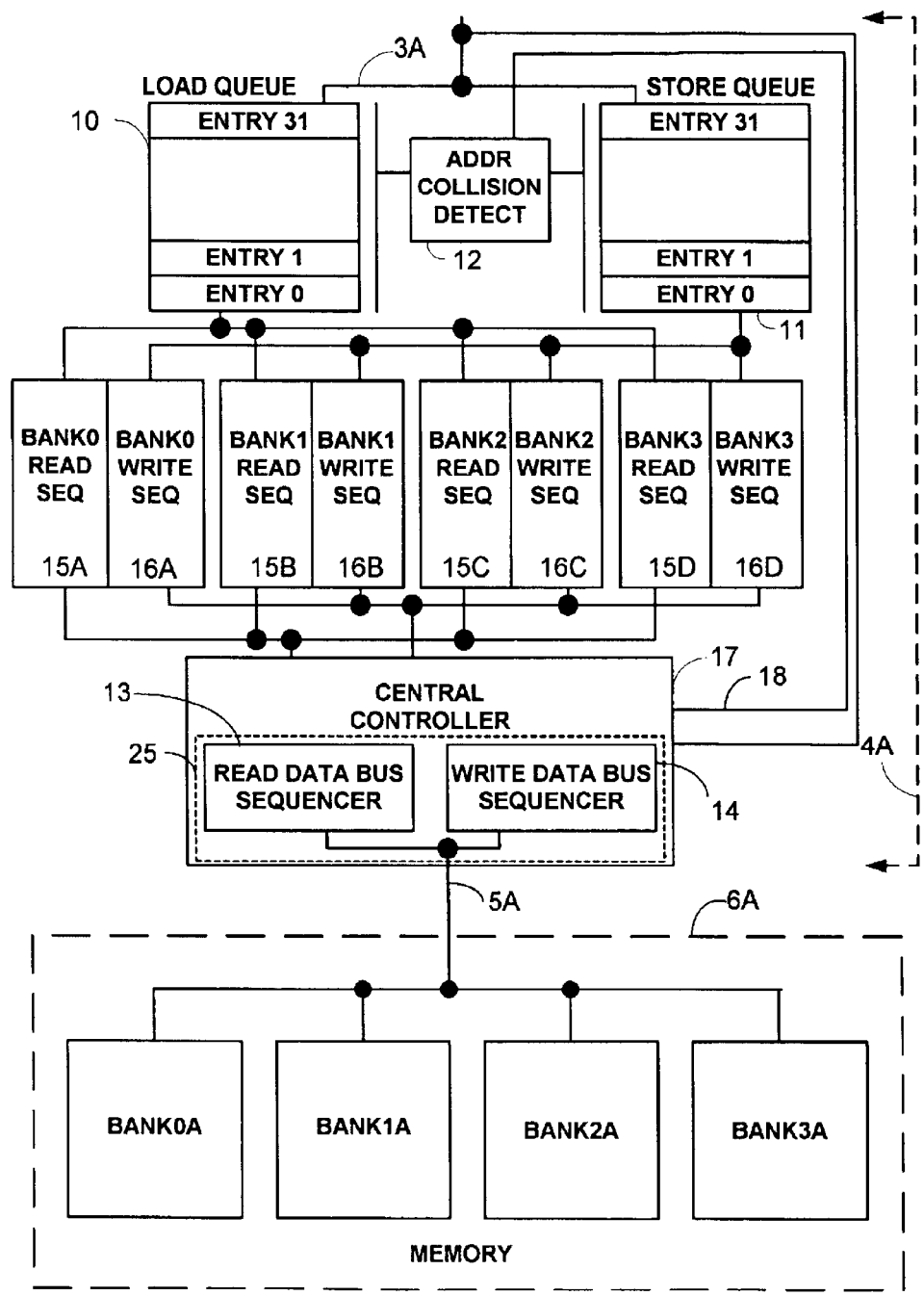
FIG. 4 shows a detailed block diagram of an improved memory controller as taught in the invention and the memory it controls.

FIG. 4 shows a detailed block diagram of an improved memory controller 4A, according to the present invention. Processor data bus 3A performs the same function as processor data bus 3, and couples processors (not shown) with improved memory controller 4A. Processor data bus 3A is coupled to a load queue 10, a store queue 11, and a central controller 17. Memory data bus 5A in FIG. 4 performs the same function as memory data bus 5 of FIGS. 1 and 2; that is, to couple improved memory controller 4A to memory 6A, which comprises a plurality of memory banks bank0A, bank1A, bank2A, and bank3A. There can be any number of memory banks in memory 6A. Advantageously, the number of memory banks in memory 6A can be 2, 4, 8, 16, 32, or a further power of 2.

Load queue 10 comprises a plurality of storage locations for load requests. Load queue 10 is shown to provide space for 32 load request entries, but a load queue 10 of any size is contemplated. When a processor requires data, a load request is transmitted on processor data bus 3A, and the load request is temporarily placed in load queue 10.

Store queue 11 comprises a plurality of storage locations for store requests. Store queue 11 is shown to provide space for 32 store request entries, but a store queue 11 of any size is contemplated. When a processor needs to write data to memory, a store request is transmitted on processor data bus 3A, and the store request is temporarily placed in store queue 11.

A plurality of bank read sequencers 15A–15D and bank write sequencers 16A–16D are provided by the invention to manage forwarding of load and store requests from load queue 10 and store queue 11. An instance of a read bank sequencer in the group 15A–15D will simply be referred to as read bank sequencer 15, unless the particular read bank sequencer must be uniquely identified, and will then be referred to as 15A, 15B, 15C, or 15D. An instance of a write bank sequencer in the group 16A–16D will simply be referred to as write bank sequencer 16, unless the particular write bank sequencer must be uniquely identified, and will then be referred to as 16A, 16B, 16C, or 16D. A bank read sequencer 15 maintains a queue of load requests directed to a memory bank with which the bank read sequencer 15 is dedicated. Each bank read sequencer 15 is coupled to a central controller 17 and receives information about when central controller 17 actually accesses the bank that the bank read sequencer 15 is associated with. The bank read sequencer 15 does not forward another load request to central controller 17 until the memory bank uniquely associated with the bank read sequencer 15 is capable of accepting the request.

Central controller 4A advantageously comprises data bus sequencer 25 to drive the RAS, CAS, and other required control signals to memory 6A. Read data bus sequencer 13 and write data bus sequencer 14 together make up the data bus sequencer. Read data bus sequencer 13 and write data bus sequencer 14 are shown as separate units for clarity of example only. Data bus sequencer 25 can be implemented as a single, integrated unit. In a preferred embodiment, data bus sequencer 25, upon receiving a request from central controller 17, immediately executes that request, beginning a specified sequence of transmitting RAS, CAS, and other memory control signals on memory data bus 5A. In this preferred embodiment, data bus sequencer 25 does not have to wait for any event other than those defined by RAS, CAS, or other control timings specified for memory 6A.

Those skilled in the art will appreciate that, although data bus sequencer 25 is shown to be inside central controller 17, this is for exemplary purposes only. Data bus sequencer 25 can also be implemented as a separate unit that is coupled to central controller 17, as well as to memory 6A.

FIG. 3E shows the same case as FIG. 3D, however improved memory controller 4A has changed the order of access such that request for data D is sent to memory 6A before the request for data C. As is seen, the RAS for data A is sent on cycle 1, and the RAS for data C (assumed to reside in the same bank as data A) is sent on cycle 13, thus satisfying the exemplary timing requirements. Memory data bus 5A is seen to be 100% utilized once data transmittal has begun in cycle 7.

Figure 6:
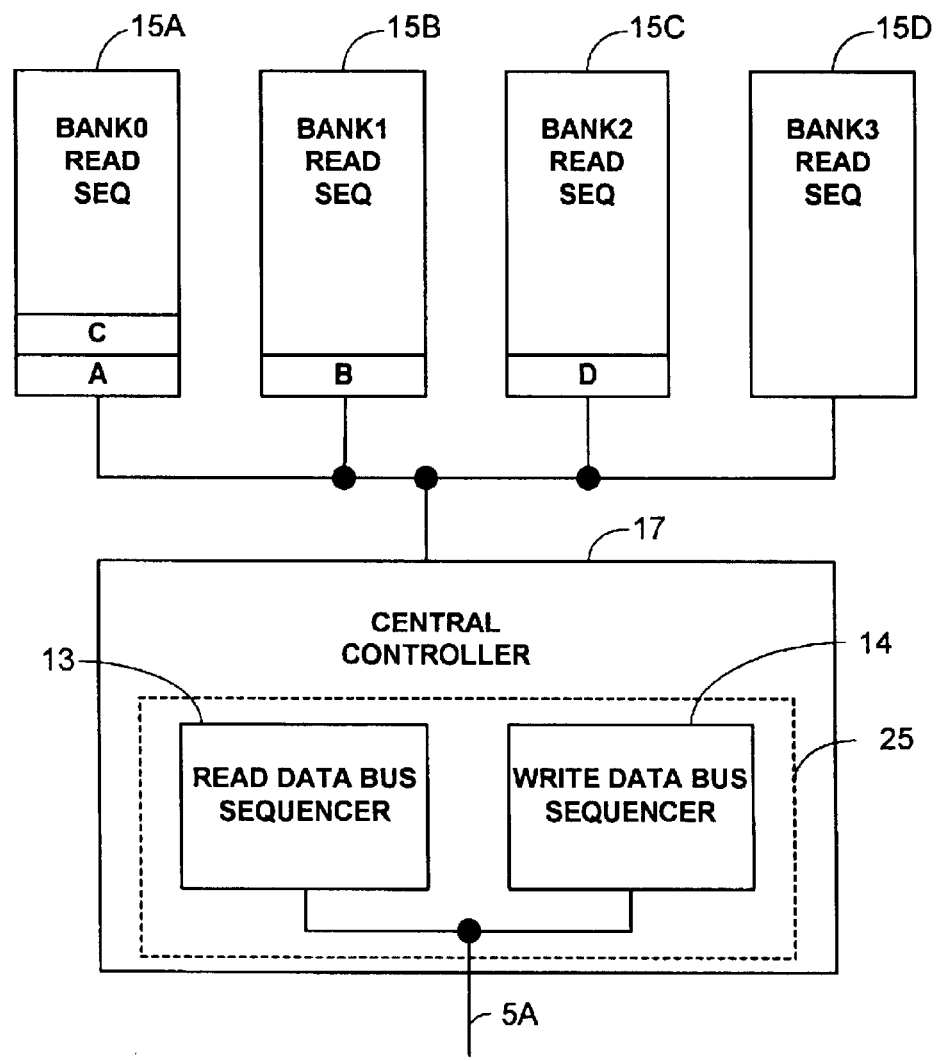
FIG. 6 shows bank sequencers coupled to a central controller as taught by the present invention.

FIG. 6 shows an example of how the load requests previously described in FIG. 3E are handled by dedicated bank read sequencers 15A–15D. Load request A is destined for memory bank0A, and is therefore moved from load queue 10 to bank0 read sequencer 15A over the coupling shown in FIG. 4. Load request B is destined for memory bank1A, and is therefore handled by bank1 read sequencer 15B. Load request C is also destined for memory bank0A, and is therefore also handled by bank0 read sequencer 15A. Load request D is destined for memory bank2A, and is therefore handled by bank2 read sequencer 15C. Bank0 read sequencer 15A forwards request A to central controller 17, which, as shown in FIG. 3E, results in a RAS to open bank0A on cycle 1. Memory controller 4A follows the RAS with a CAS to bank0A three cycles later. Bank0A of memory 6A places four cycles of data for request A on memory data bus 5A starting on cycle 7, under the exemplary timing rules. Bank0 read sequencer 15A does not forward request C to central controller 17 until such time as bank0A can handle request C. Under the exemplary timing rules, bank0 read sequencer 15A will forward request C to central controller 17 on cycle 12. Request B and request D can be handled by bank1A and by bank2A as soon as memory data bus 5A is available. Requests B and D can therefore be forwarded to central controller 17 as valid requests as early as cycle 1, and central controller 17 can issue these requests in the order it chooses when memory data bus 5A is available. In the example of FIG. 3E, the RAS for request B is sent on cycle 5, with the CAS for request B sent on cycle 8. Bank1A of memory 6A responds with four cycles of data on memory data bus 5A on cycles 11, 12, 13, and 14. Central controller 17 then issues the RAS for request D on cycle 9, followed by the CAS for request D on cycle 12. Bank2A of memory 6A responds with four cycles of data on memory data bus 5A on cycles 15, 16, 17, and 18. Bank0A is available for another read beginning on cycle 12, and bank0 read sequencer 15A forwards request C to central controller 17 on cycle 12. Central controller 17 issues the RAS and CAS on cycles 13 and 16, respectively, for request C, resulting in bank0A placing request C data on memory data bus 5A on cycles 19, 20, 21, and 22.

Bank write sequencers 16A–16D perform in a similar fashion, using bank write timing requirements specified for the memory technology; each bank write sequencer 16 receiving store requests from store queue 11 for stores to the bank associated with the bank write sequencer. Each bank write sequencer 16, like each bank read sequencer 15, is uniquely associated with a single memory bank. Each bank write sequencer 16 ensures that no store request is forwarded to central controller until the memory bank that will receive the data is ready to receive the request.

The bank read sequencer 15 and the bank write sequencer 16 for a particular memory bank are coupled together and communicate with each other to ensure that every load and store request forwarded to central controller 17 can be handled by the particular memory bank whenever central controller 17 chooses to process the request. For example, bank0 read sequencer 15A is coupled to bank0 write sequencer 16A and each is aware of requests sent to and processed by central controller 17. Neither bank0 read sequencer 15A nor bank0 write sequencer 16A will forward a request to central controller 17 until memory bank0A is capable of handling the request.

Bank read sequencers 15 and bank write sequencers 16 are shown as separate units for clarity; however, those skilled in the art will understand that each read bank sequencer 15 and it's companion write bank sequencer 16 together can be considered together as a bank sequencer uniquely associated with a memory bank. The invention contemplates physically combining each read bank sequencer 15 with its associated write bank sequencer 16.

Figure 5:
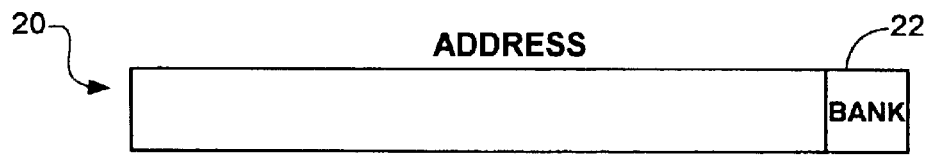

FIG. 5 shows an address 20 that is a portion of a load or store request. A portion of address 20 contains the identity of which memory bank the request is destined for. The bank identity 22 is shown in FIG. 5 as a number of least significant address bits; however, any bit or bits from address 20 can be used in a particular implementation for identification of the destination memory bank.

It is important to reduce or eliminate, to the extent possible, periods of time during which data is not transmitted over memory data bus 5A when unsatisfied load requests or store requests are pending. Unutilized cycles on memory data bus 5A, when there are unsatisfied requests to read from or write to memory reduce the throughput of the computer system.

Ordinarily, load requests are serviced by central controller 17 before store requests. A processor issues a load because that processor requires information from memory 6A to continue processing. The information might be additional computer program instructions, or the information might be data used by computer instructions. In either case, the processor will stall if the data is not quickly provided. In contrast, a processor makes store requests when that processor is finished with the data involved. Under most circumstances, central controller 17 can defer handling a store request in favor of a load request without affecting throughput of the computer system.

Figure 7:
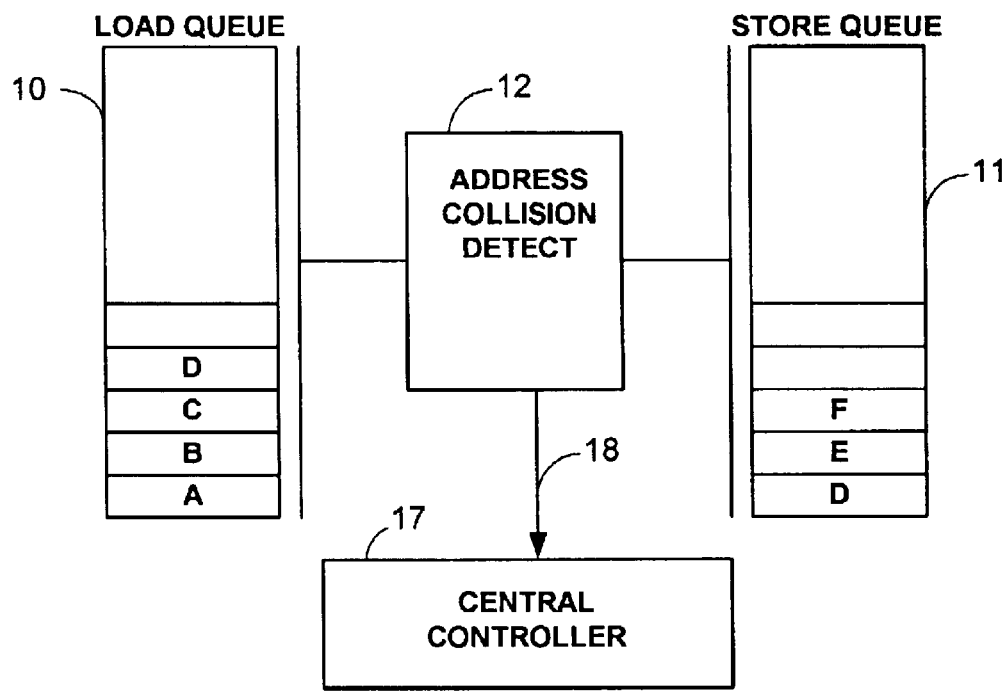
FIG. 7 shows an address collision detector coupled to a load queue and a store queue. The detector is coupled to a central controller.

Occasionally, circumstances arise where central controller 17 must execute a store before a load. FIG. 7 shows an example of one such situation. Load queue 10 has a load request D stored. Store queue 11 has a store request D stored. That is, a request to load data from an address and a request to store data to the same address are both pending. Address collision detect 12 detects that this same address is in both load queue 10 and store queue 11, and signals central controller 17 via signal 18 that an address collision has been detected. Central controller 17 raises priority of the store request D, and ensures that the store request D is handled prior to load request D. When load request D is subsequently processed, the updated information from store request D is in memory 6A.

Figure 8:
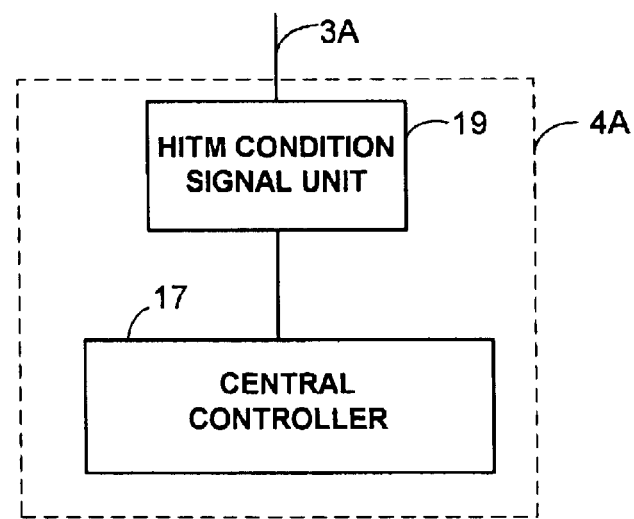
FIG. 8 shows a portion of the memory controller, highlighting connectivity of a HITM condition signal unit.

Another circumstance that can override the normal central controller 17 priority of processing reads before writes is a "HITM" (Hit Modified) condition. When a processor makes a request on processor bus 3A, other processors 'snoop' in their caches. If they have a copy of that cache line in their cache, they will take one of three actions. If they have a shared copy and they will discard their copy, they will not assert HIT or HITM, and drop the copy from their cache. If they have a shared copy and intend to keep a copy of the data, they will assert HIT, so the requesting processor knows another copy is present in the system. If a processor has a modified copy of the data, it will assert HITM (hit modified) for snoop results, and then drive the modified data on the processor data bus 3A. This is called an 'Implicit Writeback'. The requesting processor will read this data off processor data bus 3A. A HITM condition signal unit 19 in memory controller 4A, as shown in FIG. 8, is coupled to processor data bus 3A, and recognizes when HITM is asserted. HITM condition signal unit 19 signals central controller 17, which then will read the modified data from processor data bus 3A and write it out to memory 6A with a high priority. In some implementations, central controller 17 will write the modified data to memory 6A before handling any other pending load requests or store requests.

Yet another condition that might make memory controller 4A process a store request while load requests are pending is when store queue 11 contains more than a predetermined number of store requests. Memory controller 4A may choose to process a number of store requests under this condition in order that store queue 11 not become completely filled up and therefore be unable to accept further store requests.

Improved memory controller 4A provides for optimizing throughput on memory data bus 5A. Loads are performed before stores, with predefined exceptions for raising some store priorities under special circumstances, as described in the several exemplary exceptions above. Other exceptions may also be defined to alter the normal priority convention.

While the present invention has been described with reference to the details of the embodiments of the invention shown in the drawings, these details are not intended to limit the scope of the invention as claimed in the appended claims.

What is claimed is:

1. A computer system comprising:

a memory further comprising a plurality of memory banks;

a memory controller coupled to the memory via a memory data bus, the memory controller further comprising:

a plurality of bank sequencers, wherein each of the plurality of bank sequencers is uniquely associated with one instance of a memory bank; and a central controller coupled to each of the bank sequencers, and to the memory; and a processor that issues load requests and store requests, the processor coupled to the memory controller via a processor data bus;

wherein the memory controller reorders the load requests and the store requests in order to optimize use of the memory data bus by having the bank sequencers not forward a load request or a store request to the central controller until the associated memory bank is capable of servicing the request.

2. The computer system of claim 1, in which the number of memory banks is 16, and the number of bank sequencers is 16.

3. The computer system of claim 1, in which the number of memory banks is 8, and the number of bank sequencers is 8.

4. The computer system of claim 1, in which the number of memory banks is 4, and the number of bank sequencers is 4.

5. The computer system of claim 1, in which a bank sequencer comprises a read bank sequencer and a write bank sequencer.

6. The computer system of claim 1, further comprising a memory data bus sequencer that immediately drives a predetermined sequence of control signals on the memory data bus upon receiving a request from the central controller.

7. The computer system of claim 1, in which the memory controller further comprises:

a load queue coupled to the processor data bus, the load queue storing load requests;

a store queue coupled to the processor data bus, the store queue storing store requests; and an address collision detector;

wherein the address collision detector is capable of detecting that a request in the load queue contains the same address as a request in the store queue, and, respondent to that detection, signals the central controller that an address collision has been detected, the central controller then executing the store request prior to the load request.

8. The computer system of claim 1, further comprising:

a HIT-modified detector in the processor that drives a HITM condition signal on the processor data bus upon detection of a HITM condition;

a control device in the processor that drives data associated with the HITM condition on the processor data bus; and a HITM condition signal unit in the memory controller that recognizes activation of the HITM condition signal on the processor data bus, and causes the memory controller to store the data associated with the HITM condition to be stored in the memory.

9. The computer system of claim 8, wherein the memory controller causes the data associated with the HITM condition to be stored in the memory with a high priority.

10. The computer system of claim 9, wherein the memory controller stores the data associated with the HITM condition to be stored in the memory before any other pending load or store requests are handled.

11. A method of processing load requests and store requests in a memory controller in a computer system having a memory, comprising the steps of:

sending load requests and store requests by a processor via a processor data bus;

receiving the load requests and the store requests by a memory controller; and reordering the load requests and the store requests by the memory controller to optimize use of a memory data bus, the step of reordering further comprising the steps of:

moving each load request and each store request into a bank sequencer, the bank sequencer being uniquely associated with a memory bank in the memory; and forwarding each load request and each store request from a bank sequencer to a central controller no sooner than a time at which the associated memory bank can handle the load request or the store request; and dispatching load requests and store requests by the central controller to a memory data bus sequencer, the requests being immediately executed by the memory data bus sequencer upon receipt by the memory data bus sequencer.

12. The method of claim 11, further comprising the steps of:

moving each load request into a read bank sequencer, the read bank sequencer being uniquely associated with a memory bank;

moving each store request into a write bank sequencer, the write bank sequencer being uniquely associated with a memory bank;

forwarding each load request from the read bank sequencer to a central controller no sooner than a time at which the associated memory bank can handle the load request; and forwarding each store request from the write bank sequencer to a central controller no sooner than a time at which the associated memory bank can handle the store request.

* * * * *